No. 762,721.

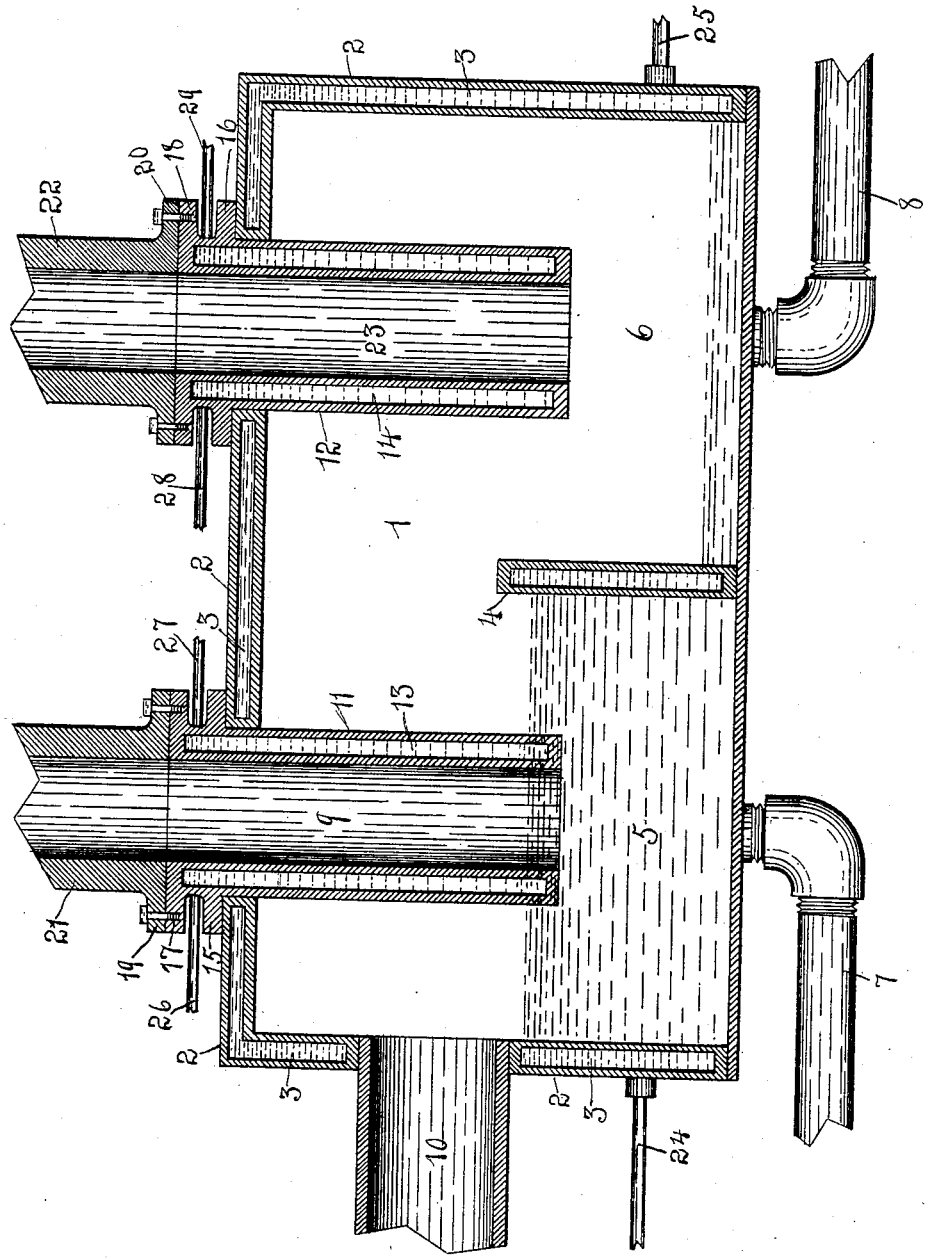

Patented June 14, 1904.

UNITED STATES PATENT OFFICE.

WILLIAM H. HUME, OF BUFFALO, NEW YORK.

REVERSING-VALVE.

SPECIFICATION forming part of Letters Patent No. 762,721, dated June 14, 1904.

Application filed May 29, 1902. Renewed July 3, 1903. Serial No. 164,248. (No model.)

*To all whom it may concern:*

Be it known that I, WILLIAM H. HUME, a subject of the King of Great Britain, residing at Buffalo, in the county of Erie and State of New York, have invented certain new and useful Improvements in Reversing-Valves; and I do hereby declare the following to be a full, clear, and exact description of the invention, such as will enable others skilled in the art to which it appertains to make and use the same, reference being had to the accompanying drawing, and to figures of reference marked thereon, which forms a part of this specification.

My invention relates to improvements in that class of reversing-valves which are employed to regulate and control both the flow of gas and air to a regenerative furnace of the Siemens or other type and the discharge of the spent gas into the stack.

The object of my invention is to entirely eliminate the employment of any feature of a mechanical nature in the construction of the valve—in other words, to provide an improved form of valve in which the operative functions will not be impaired by the intense heat of the spent gases in their passage to the stack.

To this end my invention consists of a chamber provided upon its floor with two separate open compartments, a passage from such chamber to the furnace, an inlet-passage for gas or air extending down into one of the open compartments, an exit-passage for spent gas extending down into the other open compartment, and water in the two separate open compartments for alternate action upon the open ends of the inlet and exit passages to regulate and control the flow of gas and air and the discharge of spent gas.

The figure of the drawing is a central vertical section of my improved valve.

Referring to such figure, 1 is the valve-chamber, the walls 2 of which are surrounded by a water-jacket 3, having inlet and outlet pipes 24 and 25. Across the lower portion of the chamber 1 is centrally arranged the transversal partition-wall 4, forming the two separate open compartments 5 and 6, adapted for the reception of separate bodies of water, the levels of which are controlled through the pipes 7 and 8, leading from the floors of the two compartments to a suitable apparatus (not herein shown) for simultaneously raising the water-level in one compartment and lowering the same in the other compartment.

9 is the inlet-passage for the admission of either gas or air to the furnace through the passage 10, connecting the valve-chamber 1 with the furnace. (Not shown.)

23 is the exit-passage leading to the stack and through which the spent gas from the furnace is discharged. These two passages extend down into the open compartments 5 and 6 to a point below the upper edge of the partition-wall 4, as shown. I preferably form these passages of cylindrical pipes 11 and 12, with the hollow cylindrical spaces 13 and 14 for the reception of cold water and provided with the inlet and outlet pipes 26 27 and 28 29.

15 and 16 are annular flanges which rest upon the cover of chamber 1 and hold the pipes 11 and 12 in removable position.

17 and 18 are additional annular flanges, to which are removably secured the annular flanges 19 and 20 of the pipes 21 and 22, which form a continuation of the pipes 11 and 12 within the chamber 1.

As illustrated in the drawing, the water-level in compartment 5 is above the lower end of the passage 9 and the flow of gas or air to the furnace is stopped. At the same time the water-level in compartment 6 is below the lower end of passage 23, thus permitting the discharge of spent gas to the stack. By a reversal of the water-levels in the two compartments the gas or air is permitted to flow to the furnace and the discharge of spent gas is arrested.

The quantity of gas fed to the furnace through passage 9 and the quantity of discharge of spent gas through passage 10 may be easily controlled by regulating the distance of the water-level to or from the lower open ends of these passages.

It will be seen from the above description that there are actually no mechanical operative parts to my improved valve, and consequently nothing to be destroyed or thrown out of operation by the intense heat of the spent gas in its passage through the valve-chamber.

In other words, the open lower ends of the two passages 9 and 23 are the valve-seats, and the separate bodies of water in the two compartments 5 and 6 are actually the valves which regulate and control both the flow of gas and air to the furnace and the discharge of the spent gas into the stack.

I claim—

1. A reversing-valve consisting of a chamber having separate open compartments arranged therein and an opening in the top thereof above each compartment, said compartments being in communication with the furnace, an inlet-passage for gas and air supported within and depending from one of the aforesaid openings into the open compartment therebeneath, an exit-passage for spent gas removably supported within and depending from the other of the aforesaid openings into the open compartment therebeneath, water in each of the compartments for alternate action upon the said depending passages to regulate and control the flow of gas and air and the discharge of spent gas, and means for adding water and varying the level thereof in the compartments of the valve.

2. A reversing-valve consisting of a chamber having a surrounding water-jacket, a partition arranged within the chamber forming separate open compartments, the open compartments being in communication with the furnace, an inlet-passage for gas and air having a surrounding water-jacket, an exit-passage for spent gas having a surrounding water-jacket, water in the separate compartments for regulating and controlling the flow of gas and air and the discharge of the spent gas, and means for adding water and varying the level thereof in the compartments of the valve.

3. A reversing-valve consisting of a chamber having separate open compartments arranged therein and an opening in the top thereof above each compartment, the compartments being in communication with the furnace, an inlet-passage supported within one of the aforesaid openings above the compartment therebeneath, an exit-passage supported within the other of the said openings above the compartment therebeneath, water in each of the compartments to regulate and control the flow through the inlet and exit passages, and means for adding water and varying the level thereof in the compartments of the valve.

4. A reversing-valve consisting of a chamber having separate open compartments therein, said compartments being in communication with the furnace, an inlet-passage for gas and air leading to one of the compartments, an exit-passage for spent gas leading from the other open compartment, both of the said passages having surrounding water-jackets, water in each of the compartments for alternate action upon the inlet and exit passages to regulate and control the flow of gas and air and the spent gas, and means for adding water and varying the level thereof in the compartments of the valve.

In testimony whereof I have signed my name to this specification in the presence of two subscribing witnesses.

WILLIAM H. HUME.

Witnesses:
C. B. BUTLER,
W. T. MILLER.